United States Patent [19]
Trombley et al.

[11] Patent Number: 5,857,163
[45] Date of Patent: Jan. 5, 1999

[54] ADAPTIVE ENGINE CONTROL RESPONSIVE TO CATALYST DETERIORATION ESTIMATION

[75] Inventors: Douglas Edward Trombley, Grosse Pointe Woods; Kenneth James Buslepp, Brighton; Aidan Michael Miller, Howell, all of Mich.

[73] Assignee: General Motors Corporation, Detroit, Mich.

[21] Appl. No.: 570,883

[22] Filed: Dec. 12, 1995

[51] Int. Cl.⁶ ..................................................... G06G 7/70
[52] U.S. Cl. ........................ 701/101; 701/102; 701/108; 701/109; 60/276; 60/277; 123/703
[58] Field of Search .................... 364/431.01, 431.03, 364/431.04, 431.051, 431.052, 431.053, 431.061, 431.062; 60/274, 276, 277, 285, 284, 286, 300, 278; 123/691, 675, 673, 687, 690, 419, 424, 681, 701, 703, 674; 73/118.1, 116, 117.3

[56] References Cited

U.S. PATENT DOCUMENTS

| | | |
|---|---|---|
| 4,130,095 | 12/1978 | Bowler et al. ........................ 123/675 |
| 4,459,669 | 7/1984 | Chujo et al. ..................... 364/431.062 |
| 4,884,066 | 11/1989 | Miyata et al. ............................ 60/276 |
| 5,099,818 | 3/1992 | Takahashi et al. ...................... 123/679 |
| 5,201,173 | 4/1993 | Fujimoto et al. ......................... 60/277 |
| 5,261,230 | 11/1993 | Yuuki et al. ............................. 60/276 |
| 5,279,115 | 1/1994 | Inoue et al. .............................. 60/276 |
| 5,301,501 | 4/1994 | Shimizu et al. .......................... 60/276 |
| 5,303,548 | 4/1994 | Shimizu et al. .......................... 60/276 |
| 5,311,853 | 5/1994 | Takahashi et al. ...................... 123/681 |
| 5,337,556 | 8/1994 | Aihara ..................................... 60/276 |
| 5,359,853 | 11/1994 | Shimizu ................................... 60/276 |
| 5,381,657 | 1/1995 | Takizawa et al. ........................ 60/276 |
| 5,412,941 | 5/1995 | Suzuki et al. ............................ 60/276 |
| 5,412,942 | 5/1995 | Mukai et al. ............................ 60/276 |
| 5,428,955 | 7/1995 | Yuuki et al. ............................. 60/276 |
| 5,693,877 | 12/1997 | Ohsuga et al. ........................... 60/276 |

*Primary Examiner*—Jacques H. Louis-Jacques
*Attorney, Agent, or Firm*—Michael J. Bridges

[57] ABSTRACT

Control of operation of an internal combustion engine is responsive to an estimate of catalyst deterioration in an engine exhaust gas catalytic treatment device, including ignition timing control, intake air control, and supplemental catalyst heating control. The deterioration estimate is responsive to a catalyst temperature estimate which may be corrected in accord with the estimated deterioration.

6 Claims, 4 Drawing Sheets

ADAPTIVE ENGINE CONTROL RESPONSIVE TO CATALYST DETERIORATION ESTIMATION

FIELD OF THE INVENTION

This invention relates to automotive internal combustion engine control and, more particularly, to adapting engine controls in response to performance variation in engine emissions control systems.

BACKGROUND OF THE INVENTION

Catalytic treatment devices, known as catalytic converters, for treating internal combustion engine exhaust gasses, are known to deteriorate with use. Specifically, the efficiency with which the catalyst of catalytic treatment devices convert such engine exhaust gasses as carbon monoxide, oxides of nitrogen, and hydrocarbons decreases over the life of the treatment device and the light-off time of the device increases. Light-off time is the time required for a catalytic converter to reach a prescribed efficiency following a coldstart of the engine. Catalytic converter deterioration can result in increased automotive vehicle emissions. The increase in emissions can however, be mitigated to some extent by compromising other vehicle control strategies. Current vehicle control strategies are designed using a near worst case catalyst deterioration model, so that even near worst case catalyst deterioration, such as caused by worst case driving conditions, the treated engine emissions will still meet aggressive emissions control constraints. Worst case driving conditions are uncommon. As a result, many of the compromises made under worst case catalyst deterioration models are unnecessary to meet even highly ambitious emissions control constraints, such as for the vast majority of vehicles not exposed to the worst case driving conditions. Engine performance and fuel economy may be unnecessarily compromised using the current catalyst deterioration model.

It would therefore be desirable to avoid constraining automotive engine controls to the worst case catalyst deterioration model. It would be desirable to meet aggressive emissions control standards with minimum sacrifice to engine fuel economy and performance.

SUMMARY OF THE INVENTION

The present invention provides a desirable adaptive catalytic converter deterioration model for estimating catalyst deterioration on-line. Engine control is adapted in response to the estimation. More specifically, for an engine having a catalyst treatment device such as a catalytic converter for treating engine exhaust gas, and having an engine controller, there is provided a periodic measurement or estimation of catalyst deterioration. The measurement may be of an engine parameter substantially affecting catalyst deterioration, such as catalyst temperature. Catalyst operating time may be weighted by the measured temperature. Deterioration in performance of the catalyst treatment device away from an ideal initial calibration performance may be estimated by applying the weighted catalyst operating time to a stored deterioration model. Change in engine control strategies may then be triggered by the estimated performance deterioration. For example, if the estimated performance of the device degrades to a level corresponding to an unacceptable increase in catalyst light-off time, light-off enhancing compensation may be provided, at a cost of reduced engine fuel economy or performance. Unlike conventional deterioration models, such compensation will only have been applied when truly needed for the actual operating conditions of each vehicle, avoiding unnecessary fuel economy and performance reductions. Further, as the catalyst performance continues to degrade, as indicated by the model, additional compensation may be provided to meet exacting emission standards with minimum loss of performance or fuel economy. When compensation limits are reached, a deterioration condition may be provided to alert the operator that service operations may be required.

In accord with a further aspect of this invention, the catalyst temperature information may be provided through an accurate temperature model requiring no additional sensors over those conventionally available with an engine. The temperature model may be improved by adjusting the model parameters as the catalyst treatment device ages. More specifically, for given engine operating conditions applied to the model, a fresh or slightly aged catalyst will typically operate at a higher temperature than an older catalyst. Conventional catalyst temperature models must assume the higher temperature for the engine operating conditions so that worst case catalyst deterioration is accounted for. The result is an inaccuracy in the catalyst temperature model itself, reducing the accuracy of the deterioration model. In accord with this further aspect of the invention, the temperature model itself may adapt to changes in catalyst deterioration, wherein a high temperature model may be applied initially for a new catalyst treatment device, and may be gradually decreased as a function of estimated catalyst deterioration so that accurate catalyst temperature information may be estimated without adding sensors over the life of the catalyst treatment device.

In accord with yet a further aspect of this invention, the deterioration model of this invention may be corrected with diagnostic information provided by an independent catalyst deterioration procedure, for example a conventional procedure for measuring or estimating catalyst deterioration caused by a factor not accounted for in the model of this invention. Catalyst deterioration is known to be measured by monitoring the characteristic of the output signal of an oxygen sensor positioned downstream of the catalyst treatment device. Such deterioration may be caused by catalyst oil poisoning, mechanical fracture, etc. If deterioration is diagnosed through such conventional procedures, the deterioration model of this invention may be corrected or updated with the diagnosed condition of the catalyst, so that proper engine controls may be maintained.

Worst case deterioration approximations are thereby minimized or avoided by monitoring the deterioration of the catalyst directly and by prescribing only that compensation that is required to meet even ambitious emissions standards.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
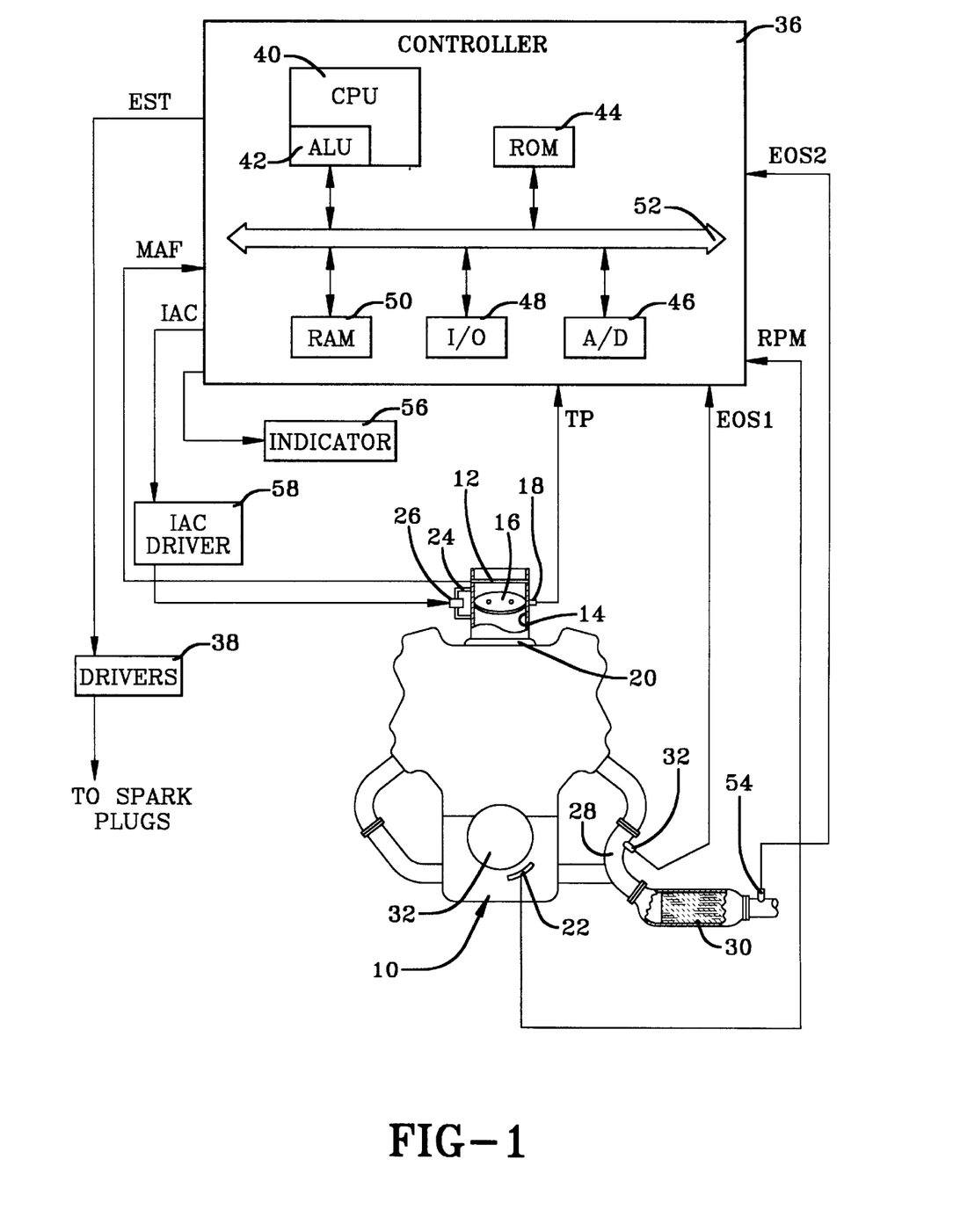
FIG. 1 is a general diagram of the engine and engine control hardware for carrying out this invention in accord with the preferred embodiment.

Referring to FIG. 1, internal combustion engine 10 receives intake air through intake air bore 14 past conventional mass airflow sensor 12, such as a hot wire or thick film type sensor transducing the engine intake air mass rate into output signal MAF. Engine intake air restriction is controlled by intake air valve 16 of the rotary or butterfly type, the rotational position of which is transduced by conventional rotary potentiometer 18 into output signal TP. Bypass conduit 24 provides an engine intake air path that is substantially independent intake air valve 16 position. Bypass valve V 26, such as a precision, responsive linear or binary solenoid valve of any conventional design is disposed in the bypass conduit 24 for controlling the conduit restrictiveness to intake airflow therethrough. The bypass valve 26 is provided for precision engine intake airflow control to provide idle control and conventional throttle follower control functions as are generally understood in the art. The engine intake air is combined with an injected fuel quantity and the air/fuel is ignited in engine cylinders. The ignition process reciprocally drives cylinder pistons (not shown) which are mechanically linked to output shaft 54, such as a crankshaft, to rotates the output shaft. A plurality of spaced teeth or notches are disposed about a circumferential portion of the output shaft 54 in position to pass a conventional position sensor 22. The position sensor 22 may take the form of a well-known variable reluctance or Hall effect sensor transducing the passage of the teeth or notches into a sensor output signal voltage magnitude variation. While the engine is operating to rotate the engine output shaft 54, a periodic, sinusoidal waveform is therefore output by the sensor 22 having a frequency proportional to the rate of passage of the teeth by the sensor 22 and thus proportional to the rate of rotation of the output shaft 54. The teeth are positioned about the shaft circumference such that each passage of a tooth by the sensor corresponds to an engine cylinder event in which a combustion event occurred in a known engine cylinder. Additional teeth or notches may further be added for engine synchronization or diagnostic procedures.

Exhaust gasses produced in the engine cylinder combustion process are guided out of engine cylinders and through exhaust gas conduit 28 to a catalytic treatment device 30, such as a conventional three-way catalytic converter for reducing levels of such undesirable exhaust gas components as carbon monoxide, hydrocarbons, and oxides of nitrogen. The treated engine exhaust gas is then released to the atmosphere. Conventional oxygen sensors 32 and 54, such as zirconia-oxide sensors, are disposed both upstream, along the normal direction of exhaust gas flow, and downstream of the catalytic treatment device 30 for sensing oxygen content in the exhaust gas and for outputting signals EOS1 and EOS2 indicating the oxygen content before and after treatment by the device 30, respectively. Such oxygen content information may be applied in an estimation of engine air/fuel ratio as is well-established in the art.

A controller 36, such as a conventional microcontroller having such elements as a central processing unit 40 with an arithmetic logic unit ALU 42, read only memory ROM devices 44, random access memory RAM devices 50, input/output control circuitry I/O 48, and analog to digital conversion circuitry A/D 46. Communication between such devices of the controller is provided through a series of data and address busses and control lines, generally illustrated as bus 52. The controller receives the sensor output signals and, through execution of a series of operations, processes the input signals and generates control, diagnostic, and maintenance output signals for application to actuators, indicators, etc. in accord with general engine control, diagnostic and maintenance practices. For example, a control command EST indicating a commanded ignition timing is output by controller 36 to ignition drivers 38 which apply timed ignition drive signals to spark plugs in engine cylinders for igniting the cylinder air/fuel mixture. Further, an idle air control signal IAC is output by controller 36 to IAC driver 58 which applies a position control command, such as in the form of a duty cycle command to bypass valve 26 for metering bypass air to intake manifold 20. Still further, an output signal for driving indicator 56 may be provided by controller 36, for example to indicate a deterioration condition of the catalytic treatment device 30, to indicate that a repair or replacement procedure is required. Indicator 56 takes the form of a conventional lamp mounted on an instrument panel visible to the engine operator.

Figure 2:
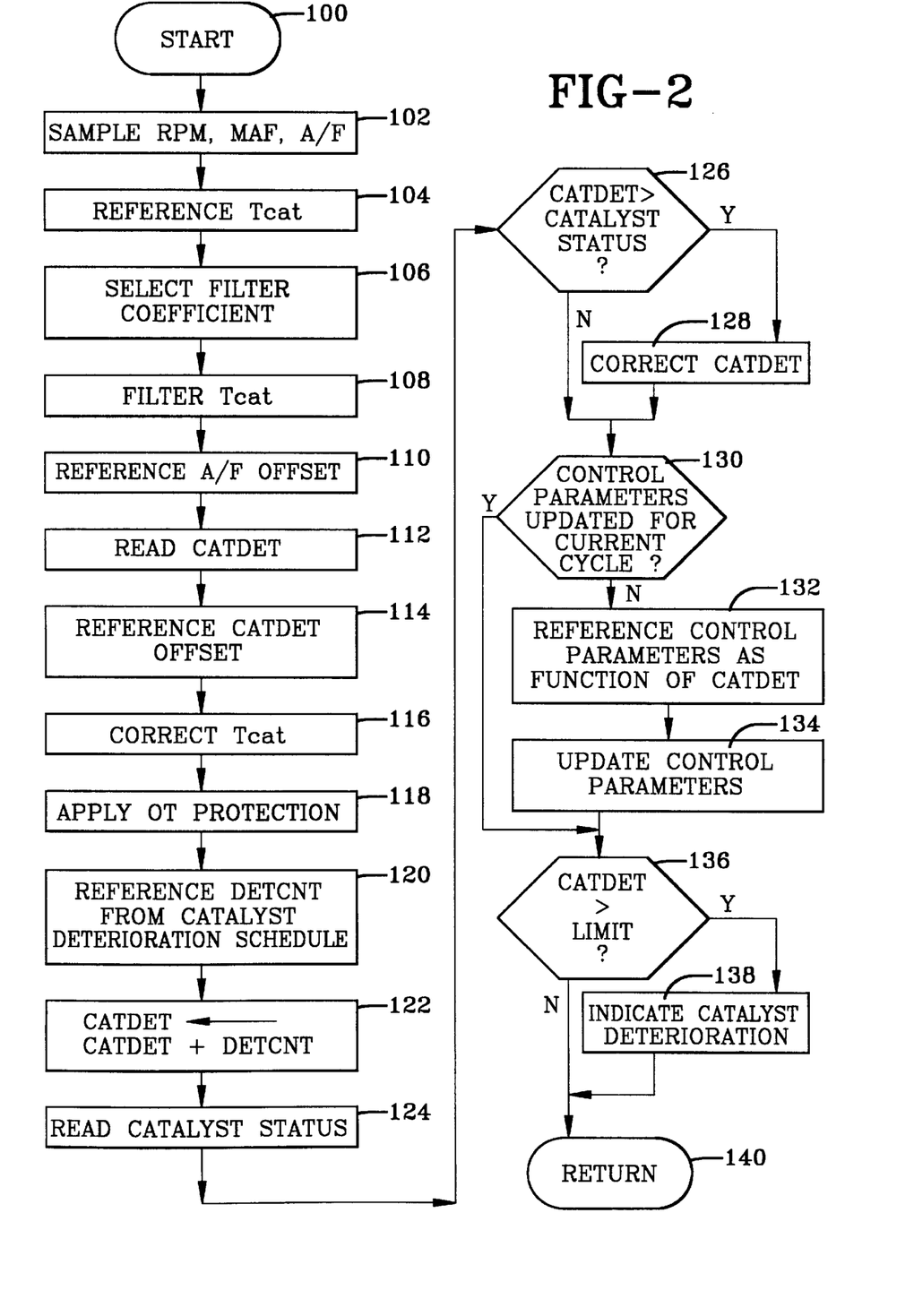
FIGS. 2 and 3 are computer flow diagrams illustrating a flow of operations for carrying out the preferred embodiment of this invention with the control hardware of FIG. 1.
Figure 3:
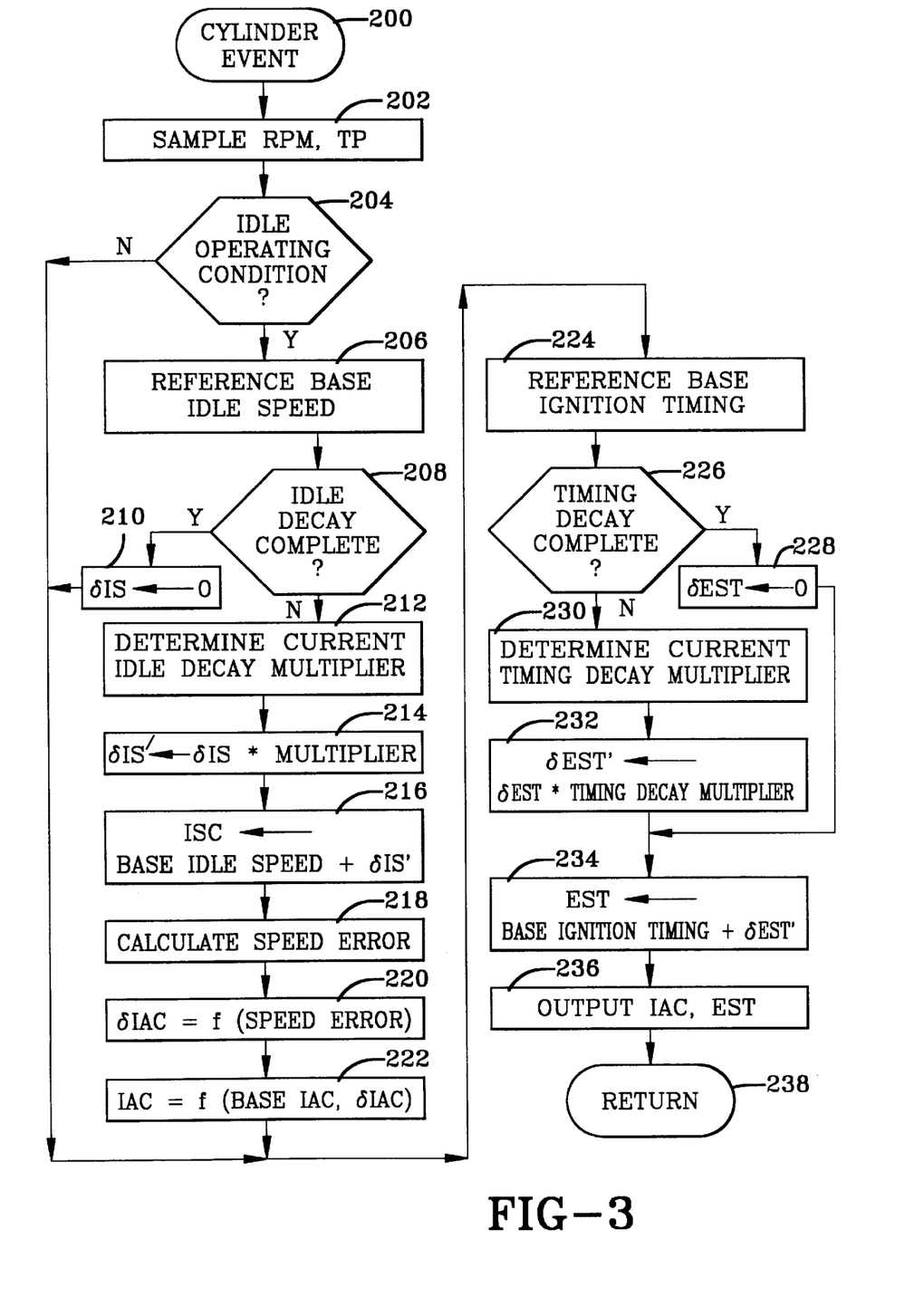

The series of operations providing for engine control and catalytic treatment device diagnostics in accord with this embodiment are illustrated generally in FIGS. 2 and 3. Such operations are periodically executed while the controller is operating, such as while ignition power is applied to the controller 36 by an engine operator. The operations may be stored in ROM 44 (FIG. 1) as controller instructions to be executed on a timer or event driven schedule. More specifically, the operations of the routine of FIG. 2 are executed once per second while the controller 36 is operating, such as initiated by a timer interrupt set up, during a conventional initialization procedure, to occur at least once per second.

Upon occurrence of the timer interrupt, the controller 36 is directed to temporarily suspend current operations and to service the interrupt through the operations of FIG. 2, beginning at a step 100 and proceeding to a step 102 to sample current values of input signals RPM, MAF, and A/F, in which A/F is an estimate of engine air/fuel ratio indicated by a collection of EOS1 signal samples, as is generally understood in the art. The temperature Tcat of the catalyst in the treatment device 30 of FIG. 1 is next estimated as a function of RPM and MAF. For example, under calibration conditions of a stoichiometric air/fuel ratio and steady state engine operation, the catalyst temperature Tcat may be directly measured using a calibration temperature probe disposed on or near the catalyst during a conventional calibration procedure and recorded as a function of MAF and RPM—two parameters which have been determined to significantly affect Tcat. The calibration results may be stored in ROM 44 (FIG. 1) as a conventional lookup table as a function of RPM and MAF, and the current Tcat estimate referenced at the described step 104 as a function of the RPM and MAF sampled at the step 102. A Tcat filter coefficient is next referenced as a function of MAF and direction of change in MAF at a next step 106. A common lag filter having a varying filter coefficient is provided in this embodiment to slow change in Tcat in accord with the engine intake airflow rate. At relatively low airflow rates, the filter coefficient will provide heavier filtering, slowing the change in Tcat in accord with a lower propensity of change in temperature due to the relatively low airflow rate. Alternatively, for relatively high airflow rates, lighter filtering will be provided through a larger filter coefficient to allow more rapid change in temperature to occur consistent with an increased propensity for catalyst temperature change. A schedule of filter coefficients may be determined in a calibration process as a function of MAF and direction of change in MAF and stored in a conventional lookup table format in RAM 44 (FIG. 1), with the filter coefficient of the table corresponding to current MAF and change in direction of MAF referenced therefrom at the step 106.

The Tcat value is next filtered at a step 108 as follows:

$$Tcat = OLDTcat + COEF*(OLDTcat - Tcat)$$

in which OLDTcat is a most recent prior Tcat value, such as for the most recent prior iteration of the routine of FIG. 2, and COEF is the filter coefficient referenced at the step 106. An air/fuel ratio offset is next referenced at a step 110 as a function of the deviation of the current air/fuel ratio away from a stoichiometric ratio. As described, the Tcat value referenced at the step 104 was determined under a calibration condition of a stoichiometric engine air/fuel ratio. Any deviation of current air/fuel ratio away from stoichiometry may lead to error in the Tcat value. For example, an offset of zero will be referenced at the step 110 for a current air/fuel ratio of 14.5, and the offset will then be decreased by about −50 degrees Celsius for each decrease of 0.5 of the air/fuel ratio below 14.5, and will be increased by about +50 degrees Celsius for each increase of 0.5 of the air/fuel ratio above 14.5. Such offset information may be stored in ROM 44 (FIG. 1) in the form of a schedule of offsets as a function of the deviation of current air/fuel ratio away from stoichiometry. After determining such offset, the current catalyst deterioration counter value CATDET is read at a next step 112 indicating a modeled degree of deterioration of the catalyst of catalytic treatment device 30 of FIG. 1, to be updated through further operations of the routine of FIG. 2.

Figure 4:
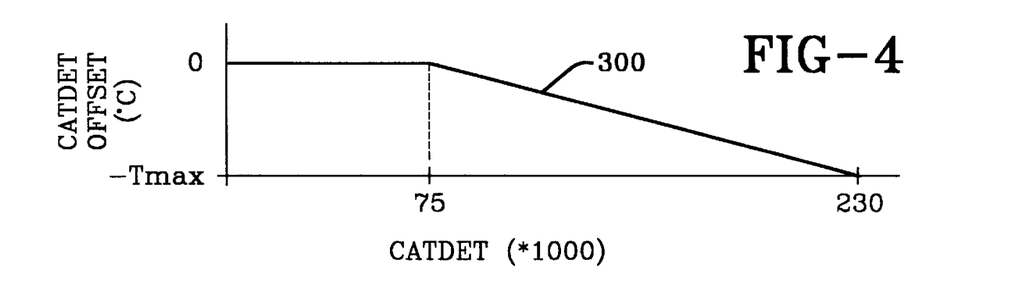
FIGS. 4–7 are graphical diagrams illustrating parameter relationships relied on in the operations of FIGS. 2 and 3.

A temperature offset is next referenced at a step 114 as a function of CATDET from a lookup table stored in ROM 44. It has been observed that, for the same engine operating conditions, such as for the same engine speed and intake mass airflow rate, the temperature of the catalyst in a catalytic treatment device, such as device 30 of FIG. 1, will decrease with catalyst aging due mainly to decreases in catalyst efficiency. To incorporate this information into the model of Tcat for an accurate catalyst temperature estimation, the degree of catalyst aging as indicated by the current value of CATDET is used to reference a temperature correction value. Compromises in the estimate of Tcat therefore are not required and accurate temperature information may be provided insensitive to catalyst aging. A typical calibration of the CATDET temperature correction offset as a function of CATDET is illustrated in curve 300 of FIG. 4. The offset is zero for CATDET values up to about 75000 corresponding approximately to thirty percent catalyst degradation, after which the offset drops down substantially linearly to a maximum offset −Tmax for a fully degraded catalyst having a CATDET value of about 230000. Tmax may be determined in a calibration process as representative decrease in catalyst operating temperature for a fully degraded catalyst.

Returning to FIG. 2, the offset information is next applied to Tcat to correct for air/fuel ratio deviations away from stoichiometry and to correct for aging by adding the offsets determined at the step 110 and 114 to Tcat. Catalyst overtemperature protection procedures may next be provided at a step 118, for example by comparing the accurate Tcat estimate to a catalyst overtemperature threshold of about 900 degrees Celsius, and taking steps, at a cost to fuel economy and performance to reduce the catalyst temperature, such as running the air/fuel ratio rich of stoichiometry, as is generally understood in the art. The accurate Tcat estimation, including the deterioration correction, in accord with this invention avoids conventional worst case temperature modeling for overtemperature protection. Rather than overinclusively assuming that the catalyst temperatures are always those of a fresh catalyst, which can lead to unnecessary application of overtemperature correction (forcing the air/fuel ratio rich, for example) and reduced fuel economy and performance, the Tcat model adjusts for catalyst deterioration, and precise overtemperature protection may be prescribed only when needed over the life of the catalyst.

Figure 5:
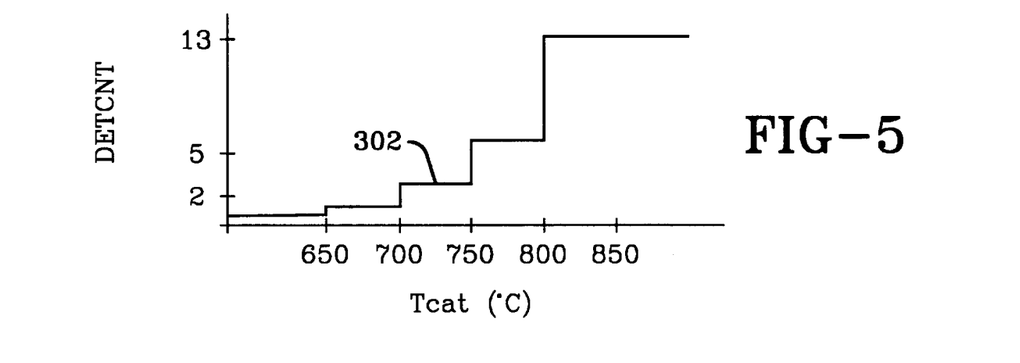

After applying any needed overtemperature protection, a deterioration count DETCNT is referenced from a catalyst deterioration schedule as a function of Tcat at a step 120. The deterioration schedule is determined during a calibration process as the degree of aging of the catalyst per unit time for current catalyst operating temperature Tcat. One such calibration is diagrammed in curve 302 of FIG. 5. The magnitude of DETCNT increases dramatically with temperature, for example from a value of less than one for Tcat between zero and 650 degrees Celsius, up to a value exceeding thirteen for Tcat exceeding 800 degrees Celsius. The curve may include further breakpoints than the four of curve 302 depending on the exhaustiveness of the calibration process. The values of DETCNT of curve 302 are calibrated as the increase in CATDET required to model the aging of the catalyst for each second of catalyst operation, due solely to temperature effects on catalyst aging.

Returning to FIG. 2, CATDET is updated with the referenced DETCNT value at a next step 122. To account for other aging effects not included in the temperature based aging model of this embodiment, a next step 124 is executed to determine if a catalyst deterioration condition has been diagnosed by any other diagnostic that may be operating in addition to the catalyst aging diagnostic of this embodiment. For example, the diagnostic described in the copending U.S. patent application Ser. No. 08/337,703, filed Nov. 14, 1994, or the copending U.S. patent application Ser. No. 08/166978, filed Dec. 14, 1993, both assigned to the assignee of this application, may likewise be operating to diagnose catalyst deterioration caused by effects including temperature, oil poisoning, mechanical fracture of the catalyst, etc., for example through direct monitoring of the activity of the catalyst in treating constituent elements of the engine exhaust gas. If a deterioration condition indicated by such additional diagnostic indicates a more severely deteriorated catalyst than is currently indicated by CATDET as determined at a next step 126, CATDET is increased to account for such diagnosed deterioration at a next step 128, so that CATDET is maintained as an accurate indication of the condition of the catalyst including effects of temperature, oil poisoning of the catalyst, and mechanical fracture, and indeed any other factor that may reduce the oxygen storage and release activity in the catalyst. The CATDET correction may be provided by modeling, if possible, the degree of deterioration indicated by such additional diagnostic into an equivalent CATDET value, and setting CATDET to such value if CATDET is determined to be less than that value.

Figure 6:
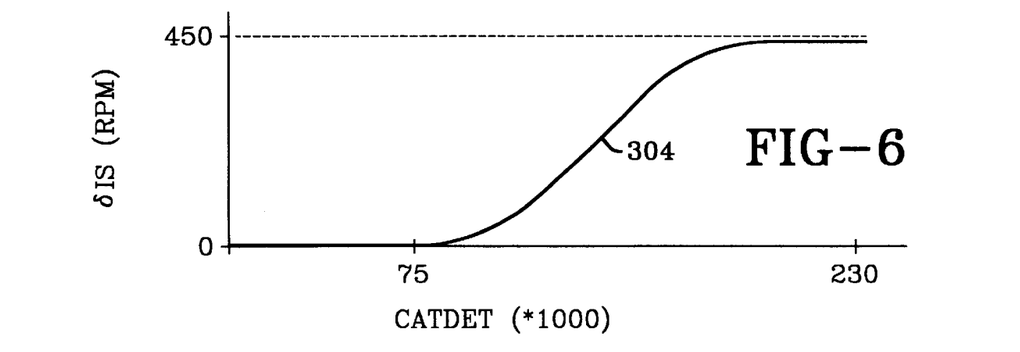

After making any necessary corrections to CATDET, a step 130 is executed to determine whether control parameters have been updated with any new catalyst deterioration information for the current vehicle ignition cycle. In this embodiment, engine control parameters are adapted to catalyst deterioration information once for each vehicle operating cycle, called a vehicle ignition cycle. If such an update is determined at the step 130 to have been provided, then further control parameter updating is unnecessary and a step 136 is next executed. Alternatively, if no such update is determined to have occurred, a control parameter set is next referenced at a step 132 as a function of CATDET. For example, the set of control parameters may be adjustment parameters for desired engine idle speed and ignition timing, such as in the form of an idle speed offset $\delta IS$ and an ignition timing offset $\delta EST$. These parameter offsets provide for light-off enhancement of the catalyst and for engine emissions reduction, such as a reduction in the level of emitted hydrocarbons. Rather than build in idle speed and ignition timing to account for a worst case catalyst deterioration at a cost to fuel economy and engine performance, beneficial idle speed targets and ignition timing may be prescribed which are only compromised, in accord with a critical feature of this invention, when catalyst deterioration indicates such compensation is truly necessary. Accordingly, a δIS and a δEST value is referenced at the step 132 as a function of CATDET. The offsets may be calibrated and stored as a function of CATDET in a conventional lookup table format in ROM 44 (FIG. 1). Curve 304 of FIG. 6 illustrates a representative relationship between δIS and CATDET representing a compensating change in desired engine idle speed to enhance catalyst light-off and to reduce engine emissions as the catalyst ages. As illustrated in the curve 304, no idle speed compensation is required for CATDET up to about 75000, corresponding in this embodiment, to about a thirty percent deterioration of the catalyst. The change in idle speed gradually rises with CATDET increases above 75000 up to a maximum compensating change in idle speed of about 450 r.p.m. for a near fully deteriorated catalyst having a CATDET value of approximately 230000.

Figure 7:
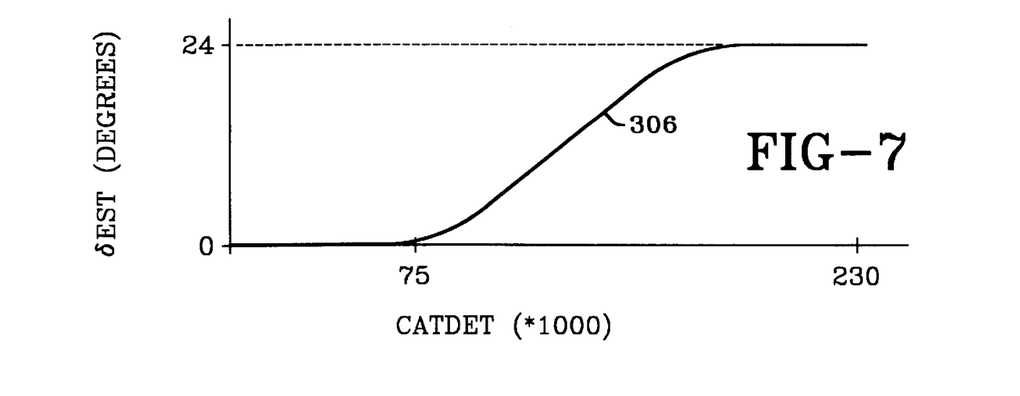

Curve 306 of FIG. 7 illustrates a representative relationship between δEST and CATDET representing a compensating change in engine ignition timing to enhance light-off of the catalyst and to reduce engine emissions as the catalyst ages. As illustrated in the curve 306, no ignition timing compensation is required for CATDET up to about 75000, corresponding in this embodiment, to a thirty percent deterioration of the catalyst. The change in ignition timing gradually rises with CATDET increases above 75000 up to a maximum compensating change in ignition timing of about 24 degrees of spark timing retard for a near fully deteriorated catalyst having a CATDET value of nearly 230000.

The calibration information represented by curves 304 and 306, stored on ROM 44 (FIG. 1) is referenced at the step 132 as a function of the current CATDET value, and is stored at a next step 134 as the current compensation values for use in engine idle speed control and engine ignition timing control for the current ignition cycle, as will be further described. Further, a flag may be set at the step 134 indicating the update for the current ignition cycle has occurred. Such flag is analyzed at the described step 130. Next, or if the control parameters were determined to already be updated for the current ignition cycle at the step 130, CATDET is compared, at a step 136, to a calibrated limit value, such as about 230000 in this embodiment to establish whether the catalyst is estimated to be fully deteriorated. If CATDET exceeds the limit value, a deterioration condition is indicated at a next step 138, for example by energizing an indicator visible to the engine operator, such as indicator 56 of FIG. 1, and storing a code or message in a non-volatile section of RAM 50 (FIG. 1) to indicate the deterioration condition, both of which indication operations are to facilitate timely service of the condition, such as by replacement of the catalyst. Such indication reduces potential for engine operation with inadequate catalytic treatment capability. After indicating the deterioration condition, or if no such deterioration condition is determined to be present, a step 140 provides for a return from the operations of the routine of FIG. 2 to any operations that may have been temporarily suspended to provide for a servicing of the timer interrupt that initiated the operations of FIG. 2.

The operations of FIG. 3 illustrate, in a step by step manner, engine control operations making use of the deterioration information generated and applied to yield control parameter offset information through the operations of FIG. 2. The operations of FIG. 3 are initiated at a step 200 following each engine cylinder event, such as following each combustion event in the engine cylinders indicated by passage of a tooth or notch of the engine output shaft 32 (FIG. 1) by sensor 22 (FIG. 1). The routine proceeds from the step 200 to sample current engine speed RPM and engine intake air valve position TP at a next step 202. If RPM and TP indicate an idle operating condition at a next step 204, then the idle speed control operations of steps 206–222 are next executed. An idle operating condition is indicated by a TP of about zero and RPM within a predetermined low RPM range of at least 500 r.p.m. Further, vehicle speed may be required to be zero to indicate an idle operating condition. If the idle operating condition is determined to be present, a base desired engine idle speed is next referenced at a step 206, such as may be calibrated as a function of engine coolant temperature, on the order of 700 r.p.m. If an idle decay period, to be described, is complete, as determined at a next step 208, then δIS is next set to zero at a step 210 and a step 224, to be described, is then executed.

If the idle decay period is not complete, then the idle engine speed offset δIS is gradually reduced toward zero according to an idle decay multiplier determined at a next step 212 as a function of the current CATDET value and as a function of the time since the startup of the engine, to drive δIS to zero in a stable, gradual manner when it is no longer required for catalyst deterioration compensation. For example, if CATDET is at a high value, such as about 230000 in this embodiment corresponding to substantially a fully deteriorated catalyst, the idle decay value will be set, in this embodiment to unity for a maximum period of time of about thirty seconds from the time of engine startup which is approximately the time since δIS was initially set for the current ignition cycle, and following such maximum period of time, δIs will be linearly decayed to zero over a maximum decay period of about sixty seconds in this embodiment. For CATDET values of about 75000 or less corresponding to δIS values of zero in this embodiment, the idle decay value will be zero. For CATDET values between a minimum and a maximum value, such as between 75000 and 230000 in this embodiment, interpolation between the described times may be provided, such as direct linear interpolation. For example, if CATDET is at a value directly between a first value (such as about 75000) and a maximum value (such as about 230000), then the idle speed decay value may be held at unity for about fifteen seconds and then decayed to zero over a sixty second period. Other approaches may be provided through the exercise of ordinary skill in the art to gradually drive δIS toward zero when it is no longer required for catalyst deterioration compensation.

When the idle decay period is complete, the decay value will be reduced to zero and a flag is set in controller RAM 50 (FIG. 1) indicating the idle decay is complete, which flag is polled at the described step 208. After determining the current idle speed decay value at the step 212, which takes the form of a multiplier in this embodiment, an idle speed offset δIS' is determined in accord with the decay value at a next step 214 as the product of the current δIs value and the multiplier. An idle speed command ISC is next generated at a step 216 as a sum of the base idle speed and δIS'.

A speed error is then determined, for example as a difference between ISC and current measured engine speed RPM at a step 218. An idle speed control actuator command change δIAC is next determined at a step 220 as a function of the speed error, for example through application of a conventional control process, such as a proportional-plus-integral control process for efficiently driving the error toward zero. An idle air control actuator command IAC is then determined as a function of a base command, which may be determined as a function of engine operating conditions in accord with conventional idle speed control practices, and the determined δIAC value at a step 222, as the output command to be applied to the idle air controller to provide a desired engine intake air rate under idle operating conditions to minimize engine speed error and compensate for catalyst deterioration in accord with this invention.

Next, or if an idle operating condition was not determined to be present at the step 204, a base engine ignition timing is referenced at a step 224, for example as a function of engine speed RPM. If a timing decay flag is set, indicating a decay period for ignition timing is complete, as determined at a next step 226, then δEST, the ignition timing offset provided in this embodiment to compensate for catalyst deterioration and the effects thereof on catalyst light-off and engine emissions, is set to zero at a next step 228, and a step 234, to be described is then executed.

If the timing decay is determined to not be complete at the step 226, a current value for a timing decay multiplier is next determined at a step 230 as a function of CATDET and of the time since the beginning of the current engine ignition cycle. The timing decay multiplier is adjusted as a function of CATDET in the manner described for the idle decay multiplier that was determined at the described step 212. For example, for CATDET values less than 75000, δEST is zero and the timing decay multiplier is maintained at zero. For CATDET values at a maximum, such as about 230000 in this embodiment, indicating a substantially completely deteriorated catalyst, the timing decay multiplier is set to unity for a period of time following the beginning of the ignition cycle, such as about ninety seconds, and then is gradually reduced toward zero over a period of time, such as over 210 seconds in this embodiment. For CATDET values between 75000 and 230000, interpolation may be used between the described timing decay multiplier values to determine an appropriate multiplier value, as was described for the step 212.

After determining the current timing decay multiplier, the current ignition timing offset δEST' is updated in accord with the multiplier at a step 232 as a product of δEST and the multiplier. An ignition timing command EST is next determined as a sum of the base ignition timing command and δEST' at a step 234. The determined commands IAC and EST are next output to respective drivers 58 and 38 (FIG. 1) at a next step 236. The command IAC will be applied to the bypass valve V 26 for engine inlet air rate control, as described, and the command EST will be applied by the driver 38 to active engine cylinder spark plugs in a timed manner governed by the EST timing in degrees of retard away from a cylinder bottom dead center position, as is generally recognized in the art. The value of IAC may be assigned through any conventional bypass valve control practices in the event idle operating conditions are not determined to be present at the step 204 of FIG. 3.

Following application of the generated commands to respective drivers, a step 238 is executed to return to any operations that were suspended to provide for the carrying out of the operations of FIG. 3. Alternatively, additional control or diagnostic operations may be required to properly service the cylinder event interrupt that initiated the operations of the routine of FIG. 3. Such additional operations may be carried out prior to executing the step 238, and may take the form of conventional engine control or diagnostic operations.

In an alternative embodiment within the scope of this invention including supplemental heating of the catalyst of the catalytic converter 30, such as through a conventional electric heating element disposed in the engine exhaust gas conduit 28 upstream of the catalyst for accelerating the light-off of the catalyst following an engine coldstart, as is generally understood in the art, the energy provided to the heating element may be varied in accord with the value of CATDET. For example, the light-off time of the catalyst may increase as the catalyst deteriorates, as described. Much less energy may therefore be required from a supplemental heating element to elevate the temperature of a fresh catalyst to light-off in an acceptable time following an engine coldstart than is required to elevate the temperature of an aged or deteriorated catalyst to light-off in that acceptable time. Rather than calibrate the control of the supplemental heating for the worst case catalyst deterioration condition, a best case calibration may be used for a fresh catalyst, which gradually moves toward the worst case calibration as a function of CATDET. A savings in energy will result, improving engine fuel economy. More specifically, the operations of the routine of FIG. 2 may reference from a stored calibration schedule, a supplemental heating index as a function of CATDET. The referenced heating index may be applied during engine startup operations to set or adjust a drive level of a catalyst supplemental heating device so that ambitious light-off times may be achieved throughout the life of the catalyst with minimum energy consumption by the heating device.

The preferred embodiment for the purpose of explaining this invention is not to be taken as limiting or restricting this invention since many modifications may be made through the exercise of ordinary skill in the art without departing from the scope of the invention.

The embodiments of the invention in which a property or privilege is claimed are described as follows:

1. An engine control method for controlling operation of an internal combustion engine which passes engine exhaust gasses to a catalytic treatment device having a catalyst for treating the engine exhaust gasses, the catalyst having an initial operating capacity, the method comprising the steps of:

sampling an input signal indicating an engine operating condition;

referencing an engine control command as a predetermined function of the sampled input signal;

estimating a degree of catalyst capacity deterioration below the initial operating capacity by (a) monitoring catalyst operating time, (b) estimating catalyst operating temperature, (c) logging the catalyst operating time, and (d) weighting the logged catalyst operating time with the estimated catalyst operating temperature, and (e) estimating the degree of catalyst capacity deterioration as a predetermined function of the weighted, logged catalyst operating time;

adjusting the referenced engine control command as a predetermined function of the estimated degree of deterioration; and controlling operation of the engine in accord with the adjusted engine control command.

2. The method of claim 1, further comprising the steps of:

determining a catalyst operating temperature correction as a predetermined function of the estimated degree of catalyst capacity deterioration; and correcting the estimated catalyst operating temperature in accord with the catalyst operating temperature correction.

3. An engine control method for controlling operation of an internal combustion engine which passes engine exhaust gasses to a catalytic treatment device having a catalyst for treating the engine exhaust gasses, the catalyst having an initial operating capacity, wherein a catalyst heating device is driven in accord with an energy control command for generating heat energy provided the catalyst to elevate catalyst temperature during a heating period, the method comprising the steps of:

sampling an input signal indicating an engine operating condition;

referencing an engine control command as a predetermined function of the sampled input signal;

estimating a degree of catalyst capacity deterioration below the initial operating capacity;

adjusting the referenced engine control command as a predetermined function of the estimated degree of deterioration;

controlling operation of the engine in accord with the adjusted engine control command;

referencing a predetermined base energy control command;

determining an energy control command correction as a predetermined function of the estimated degree of catalyst capacity deterioration;

adjusting the base energy control command in accord with the energy control command correction; and driving the catalyst heating device in accord with the adjusted base energy control command to elevate catalyst temperature during the heating period.

4. An engine control method for controlling an operating parameter of an internal combustion engine in accord with an engine control command, the engine producing exhaust gasses which are catalytically treated by a catalytic treatment device having a catalyst, the method comprising the steps of:

generating a base control command;

estimating catalyst deterioration away from an initial catalyst performance level by periodically, (a) estimating catalyst operating temperature;

(b) estimating the amount of time of catalyst operation at the estimated catalyst operating temperature;

(c) generating a catalyst deterioration count as a predetermined function of the estimated amount of time and of the estimated catalyst operating temperature; and (d) increasing a stored deterioration value by the catalyst deterioration count, wherein the increased, stored deterioration value indicates the catalyst deterioration;

determining a control command adjustment as a predetermined function of the estimated catalyst deterioration;

applying the control command adjustment to the base control command to adjust the base control command; and controlling the engine operating parameter in accord with the adjusted base control command.

5. The method of claim 4, further comprising the steps of:

determining a catalyst operating temperature correction as a predetermined function of the estimated catalyst deterioration; and correcting the estimated catalyst operating temperature in accord with the catalyst operating temperature correction.

6. An engine control method for controlling an operating parameter of an internal combustion engine in accord with an engine control command, the engine producing exhaust gasses which are catalytically treated by a catalytic treatment device having a catalyst, wherein a catalyst heating device is operated in accord with a heater control command for generating heat energy provided to the catalyst to elevate catalyst temperature during a heating period the method comprising the steps of:

generating a base control command;

estimating catalyst deterioration away from an initial catalyst performance level;

determining a control command adjustment as a predetermined function of the estimated catalyst deterioration;

applying the control command adjustment to the base control command to adjust the base control command;

controlling the engine operating parameter in accord with the adjusted base control command;

referencing a predetermined heater control command;

determining a heater control command correction as a predetermined function of the estimated catalyst deterioration;

adjusting the heater control command in accord with the heater control command correction; and operating the catalyst heating device in accord with the adjusted heater control command.

\* \* \* \* \*